United States Patent [19]

Choudhary et al.

[11] Patent Number: 5,338,488
[45] Date of Patent: Aug. 16, 1994

[54] PROCESS FOR THE PRODUCTION OF SYNTHESIS GAS BY OXIDATIVE CONVERSON OF METHANE (OR NATURAL GAS) USING COMPOSITE CATALYST CONTAINING TRANSITIONAL AND ALKINE EARTH METAL OXIDES

[75] Inventors: Vasant R. Choudhary; Amarjeet M. Rajput; Subhash D. Sansare; Bathula Prabhakar; Ajit S. Mamman, all of Maharashtra, India

[73] Assignee: Council of Scientific Research, New Delhi

[21] Appl. No.: 943,181

[22] Filed: Sep. 10, 1992

[51] Int. Cl.$^5$ ................................. C01B 3/38
[52] U.S. Cl. ........................ 252/373; 502/328
[58] Field of Search ............................ 252/373

[56] References Cited

U.S. PATENT DOCUMENTS

| | | | |
|---|---|---|---|
| 2,056,911 | 10/1936 | Schiller et al. | 252/373 |
| 2,482,866 | 9/1949 | Phinney | 252/373 |
| 2,942,958 | 6/1960 | Dwyer | 252/373 |
| 4,000,988 | 1/1977 | Uemoto et al. | 252/373 |
| 4,877,550 | 10/1989 | Goetsch et al. | 252/373 |

FOREIGN PATENT DOCUMENTS 1164389  3/1984  Canada ............................ 252/373

*Primary Examiner*—Howard T. Mars
*Attorney, Agent, or Firm*—Ladas & Parry

[57] ABSTRACT

The invention relates to a process for the production of synthesis gas by oxidative conversion of methane using composite catalysts having the formula: $T_mAO_n$, wherein T is a transition metal or metals, m is the T/A mole ratio and is from 0.01 to 100, A is an alkaline earth metal or metals, O is oxygen and n is the number of oxygen atoms needed to form a catalyst composite wherein each element of the composite has a complete set of valence electrons. In a preferred embodiment, the process includes passing a gas containing methane and oxygen over the composite catalyst in a fixed bed reactor at a pressure in the range of 0.5–50 atm, and at a temperature in the range of 200°–1000° C., and recovering the synthesis gas.

15 Claims, No Drawings

PROCESS FOR THE PRODUCTION OF SYNTHESIS GAS BY OXIDATIVE CONVERSON OF METHANE (OR NATURAL GAS) USING COMPOSITE CATALYST CONTAINING TRANSITIONAL AND ALKINE EARTH METAL OXIDES

This invention relates to an improved process for the production of synthesis gas (i.e. CO and $H_2$) by oxidation conversion of methane (or natural gas) using composite catalysts containing transitional and alkaline earth metal oxides. The process of this invention is useful for the production of synthesis gas (i.e. CO and $H_2$) and also CO or $H_2$ from methane or natural gas. The process of the present invention could be used by the producers of synthesis gas, CO and $H_2$, as well as by users of synthesis gas, CO and $H_2$; for example, those producing methanol and methanol based products, Fischer-Tropsch synthesis products such as olefins, liquid hydrocarbons, alcohols and aldehydes, oxo-synthesis products, ammonia and ammonia based fertilizers and chemicals, town gas and also reduction gas used for the production of sponge iron, etc.

The conversion of methane or natural gas to synthesis gas or carbon monoxide (CO) and hydrogen ($H_2$) by catalytic steam reforming, autothermal catalytic reforming and non-catalytic partial oxidation, is known in the prior art.

The catalytic steam reforming of methane or natural gas to synthesis gas (i.e. hydrogen and carbon monoxide) is a well established technology practiced for commercial production of hydrogen, carbon monoxide and syngas (i.e. mixture of hydrogen and carbon monoxide). In this process, hydrocarbon feeds are converted to a mixture of $H_2$, CO and $CO_2$ by reacting hydrocarbons with steam over a catalyst (NiO supported on calcium aluminate, alumina, spinel type magnesium aluminum oxide or calcium aluminate titanate) at elevated temperature (850°–1000° C.) and pressure (10–40 atm) and at steam/carbon mole ratio of 2–5 and gas hourly space velocity (based on wet feed) of about 5000–8000 per hour. This process involved following reactions.

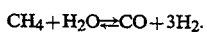

or

and

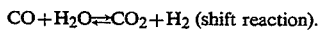

The conversion is highly endothermic and is carried out in a number of parallel tubes packed with catalyst and externally heated by flue gas of temperature of 980°–1040° C. (Kirk and Othmer, Encyclopedia of Chemical Technology, 3rd Edn., 1990 vol. 12 p. 951; Ullamann's Encyclopedia of Industrial Chemistry, 5th Edn., 1989, vol. A-12 p. 186). The main drawbacks of this process are as follows. It is highly endothermic and operated at high temperature. Hence, it is highly energy intensive. Further, the shift reaction occurring in the process energy intensive. Further, the shift reaction occurring in the process leads to formation of $CO_2$ and $H_2$ from CO and water, thus increasing $H_2$/CO ratio. Since lower $H_2$/CO ratio than that obtained by the steam reforming is required for certain applications of synthesis gas, secondary reformers using $CO_2$ or $O_2$ oxidants are frequently required to reduce the hydrogen content of synthesis gas produced by the steam reforming. Also, the supported nickel catalyst used in the steam reforming is poisoned by sulfur containing compounds present in very low concentrations in the feed hydrocarbons. Further, there is a carbon deposition on the catalyst during the steam reforming.

Autothermal catalytic reforming of methane or natural gas with air or oxygen to $H_2$, CO and $CO_2$ is also a established technology. In this process, a feed gas mixture containing hydrocarbon, steam and oxygen (or air) is passed through a burner and then the combustion gases are passed over a catalyst (nickel supported on alumina) in a fixed bed reactor at 850°–1000° C. and 20–40 atm. (Ullamann's Encyclopedia of Industrial Chemistry 5th Edn., 1989, vol. A 12, p. 202). This process has the following drawbacks. There are large temperature and space velocity variations during start-up and shut down which leads to abrasion and catalyst disintegration, requiring frequent refilling and removal of the catalyst. This process operates at high temperature and pressure and there is a formation of carbon (or carbon deposition) in the reactor.

Non-catalytic partial oxidation of hydrocarbons to $H_2$, CO and $CO_2$ is an established technology used mostly for producing hydrogen from heavy fuel oils, primarily in locations where natural gas or lighter hydrocarbons, including naptha, were unavailable or were uneconomical as compared with fuel oil or crude oil. This process is carried out by injecting preheated hydrocarbon, oxygen and steam through a specially designed burner into a closed combustion chamber, where partial oxidation of the hydrocarbons with less than stochiometric oxygen for complete combustion occurs at very high temperature (1350°–1600° C.) and pressures up to 150 atm (Kirk and Othmer, Encyclopedia of Chemical Technology 3rd Edn. 1990 vol. 12 p. 952; Ullamann's Encyclopedia of Industrial Chemistry 5th Edn., 1989, vol. 12, p. 204). The main drawbacks of this process are as follows. This process is operated at a very high temperature and very high pressure and there is extensive soot or carbon formation, particularly from heavy hydrocarbons.

Recently, Ashcroft and co-workers (Nature, vol. 344, 1990, p. 319) have reported selective oxidation of methane to synthesis gas (which is mildly exothermic reaction) using lanthanide ruthenium oxide ($Ln_2Ru_2O_7$ where Ln is lanthanide or rare earth element such as Pr, Sm, Eu, Gd, Tb, Dy, Tm, Yb, Lu) catalysts at 777° C., and total gas hourly space velocity of $4 \times 10^4$ $h^{-1}$ with $CH_4/O_2$ mole ratio 2.0 and $N_2/CH_4$ mole ratio of 2.0. The catalyst were prepared by conventional solid state reactions between $Ln_2O_3$ and $RuO_2$ in a sealed silica tube. Although, high methane conversions to CO and $H_2$ have been obtained using these catalysts, the catalyst cost is exorbitantly high because of the use of extremely costly Ru in the catalyst in stochiometric quantities (i.e. Ru/Ln mole ratio=1.0).

A process for the preparation of a novel composite catalyst, containing transitional and alkaline earth metal oxides, represented by the formula: $T_mAO_n$ wherein T is a transitional element selected from Ni, Co, Pd, Ru, Rh, Ir or the like or a mixture of two or more thereof, m (i.e. T/A mole ratio) is from 0.01 to 100, A is alkaline earth element chosen from Mg, Ca, Ba, Sr or the like or a mixture of two or more thereof, O is oxygen and n is the number of oxygen atoms needed to fulfil the valance requirement of the transitional and alkaline earth elements in the catalyst, useful for oxidative conversion of methane or natural gas to synthesis gas, CO or $H_2$ in the presence of free oxygen, has been described and claimed in our copending patent application Ser. No. 07/943,183.

The process comprises the following steps: (i) Mixing thoroughly finely ground one or more transitional metal compound represented by the formula: $TX_a$ wherein T is transitional element selected from Ni, Co, Pd, Ru, Rh, Ir or the like or a mixture of two or more thereof; X is selected from $NO_3$, $CH_3COO$, OH, O, $CO_3$, Cl or like and a is number of X required to fulfil the valence requirement of the transitional element in the compound, and one or more finely ground alkaline earth metal compound, represented by the formula: $AY_b$ wherein A is alkaline earth element selected from Mg, Ca, Ba, Sr or like or a mixture of two or more thereof, which are catalyst precursors, Y is selected from $NO_3$, OH, O, $CO_3$, $CH_3COO$ or like, and b is number of Y required to fulfil the valence requirement of the alkaline earth element, which are catalyst precursors, with the T/A mole ratio of about 0.01 to 100, with water, just sufficient to make a thick paste, or without water, (ii) heating the mixture of catalyst precursors to dryness at a temperature of about 80°–250° C. in air, (iii) decomposing the dried mass containing catalyst precursors to their oxides at a temperature of about 400°–1200° C. in presence of air or inert gas (viz. $N_2$, He, Ar or like) or under vacuum for about 0.5–50 h, (iv) powdering the decomposed mass and making by known methods catalyst pellets, extrudes or granules of required size, and (v) calcining the catalyst at a temperature of about 400°–1500° C. in presence of air, inert gas (viz. $N_2$, He, Ar or like), $CO_2$, or their mixture or under vacuum for about 1–100 h.

The main advantages of these catalysts over the other catalysts known in the prior art are as follows: (i) the catalysts have very high activity/selectivity and very high productivity for CO and $H_2$ (or synthesis gas) in the oxidative conversion of methane to synthesis gas. (ii) The catalyst production cost is much lower, (iii) Using these catalysts, the oxidative conversion of methane or natural gas to synthesis gas could be carried out at much lower temperature. (iv) The catalysts show very high activity in the oxidative conversion of methane or natural gas to synthesis gas at very much higher space velocities and hence have much higher productivity for CO and $H_2$ in the process (v) The catalysts show no loss of catalytic activity/selectivity in the process for a long period.

In view of limitations of the prior art processes used for the production of synthesis gas from methane (or natural gas), it was found desirable, during the course of the investigation leading to the present invention, to develop an improved process, which is not energy intensive (or highly endothermic), uses cheaper catalysts and operates at lower temperatures for the conversion of methane or natural gas to synthesis gas.

The main object of the present invention is to provide an improved process for the production of synthesis gas by oxidative conversion of methane or natural gas in presence of free oxygen using the novel composite catalysts containing transitional and alkaline earth metal oxides, represented by the formula described above, the process for preparation of which is described and claimed in our copending patent application Ser. No. 07/943,183.

The main finding of the present invention is that synthesis gas (i.e. $H_2$ and CO) can be produced in high yields and with very high production rate by oxidative conversion of methane to synthesis gas, in a mildly exothermic reaction, using the novel composite catalyst containing transitional and alkaline earth metal oxides, prepared by the process described and claimed in our copending patent application Ser. No. 07/943,183. Another important finding of the present invention is that synthesis gas from methane or natural gas can by the process of the present invention at much lower temperatures and at very much higher space velocities than those used in the processes known in the prior art.

Accordingly, the present invention provides a process for the production of synthesis gas by oxidative conversion of methane or natural gas in the presence of free oxygen using the novel composite catalysts containing transitional and alkaline earth metal oxide prepared by the process described and claimed in our copending patent application Ser. No. 07/943,183.

Accordingly, the present invention provides an improved process for production of synthesis gas by oxidative conversion of methane or natural gas which comprises passing continuously a gaseous reactant mixture comprising methane (or natural gas) and oxygen (or air) with or without water vapor over reduced or unreduced composite catalysts containing transitional and alkaline earth metal oxides, represented by the formula: $T_mAO_n$ wherein T is transitional element selected from Ni, Co, Pd, Ru, Rh, Ir or like or a mixture of two or more thereof, m (i.e. T/A mole ratio) is from 0.01 to 100, A is alkaline earth element chosen from Mg, Ca, Ba, Sr or like or a mixture of two or more thereof, O is oxygen and n is number of oxygen atoms required to fulfil the valence requirement of the transitional and alkaline earth elements in the catalyst, prepared by the process described and claimed in our copending patent application Ser. No. 07/943,183, in a fixed bed reactor at the following process conditions to produce gaseous products comprising carbon monoxide, hydrogen, carbon dioxide and water vapors, and separating the water vapors, unconverted reactants and feed components other than the reactants and carbon dioxide from the product stream by known methods.

The process operating conditions are as follows.

| | |
|---|---|
| Pressure | 0.5–50 atm. |
| Reaction temperature | 200°–1000° C. (preferably 300°–900° C.) |
| Gas hourly space velocity | $10^3$–$10^8$ $cm^3.g^{-1}.h^{-1}$ (preferably $2 \times 10^4$–$2 \times 10^6$ $cm^3.g^{-1}.h^{-1}$) |
| Concentration of $CH_4$ in feed | 10–90 mole % (preferably 20–80 mole %) |
| Concentration of $O_2$ in feed | 1–40% (preferably 10–36 mole %) |
| $CH_4$ (or natural gas)/$O_2$ mole ratio in feed | 1.5–10 (preferably 1.8–4) |
| Concentration of $N_2$ or Ar or their mixture in feed | 0–60 mole % |
| Concentration of water in feed | 0–65 mole % |
| $H_2O/CH_4$ (or natural gas) mole ratio in feed | 0–3.0 (preferably 0–1) |
| Concentration of $CO_2$ in feed | 0–10 mole % |
| Concentration of $C_2H_6$ in feed | 0–10 mole % |
| Concentration of | 0–5 mole % |

-continued

| | |
|---|---|
| $C_3$- and $C_4$- alkanes in feed | |

The catalyst may or may not be reduced before the catalytic reaction. The catalyst reduction may be carried out by passing continuously a gaseous mixture comprising hydrogen and inert gas over the catalyst in the fixed bed reactor at the following conditions.

| | |
|---|---|
| Catalyst reduction pressure | 1–5 atm. |
| Catalyst reduction temperature | 300°–700° C. |
| Concentration of $H_2$ in reducing gas mixture | 5–90 mole % |
| Space velocity of reducing gas mixture | $10^3$–$10^5$ cm.$^3$ g.$^{-1}$ h$^{-1}$ |
| Catalysts reduction period | 0.5–20 h |

When the catalyst is not reduced by hydrogen before the catalytic reaction, the reduction of the catalyst can be effected by passing the reaction mixture comprising $CH_4$ (or natural gas) and oxygen (or air) over the catalyst at temperature in the range of 600°– 900° C. for a period in the range of 0.5–10 h. Unless the catalyst is reduced this way or by hydrogen as described above, the catalytic oxidative conversion of methane to synthesis gas over the catalyst does not occur at lower temperatures (below 600° C.); the catalyst reaction on the unreduced catalyst occurs above 600° C. The unreduced catalyst is reduced during the catalytic reaction above 600° C. and then the process could be operated at lower temperatures.

In the aforementioned process, the products formed are carbon monoxide (CO) and hydrogen ($H_2$), as major products and water and carbon dioxide ($CO_2$) as minor products. The gaseous product stream comprises the above mentioned products, unconverted reactants (i.e. methane or natural gas and oxygen) and components of feed other than reactants.

Because of addition of water in the feed, the $H_2$/CO mole ratio in the product is increased by the shift reaction: $CO + H_2O \rightleftharpoons H_2 + CO_2$, occurring simultaneously with the oxidative conversion of methane (or natural gas) to synthesis gas.

The present invention reveals that methane or natural gas can be converted to CO and $H_2$ (or synthesis gas) in high yields with very high productivity by the said process described above.

In the said process of the invention, at 300°–900° C., the conversion of methane (or natural gas), as high as 60–100% with 80–100% selectivity for CO and H and productivity of CO and H as high as 10–30 mol. g.$^{-1}$ h.$^{-1}$ and 22–51 mol. g.$^{-1}$ h.$^{-1}$ respectively, can be achieved.

The present invention is described with respect to the following examples. These are provided for illustrative purpose only and are not to be construed as limitations on the invention.

Definition of Terms used in the Examples

Total conversion of methane (%)=Mole % of methane converted to all the products

Conversion of methane to particular product (%) or yield for a particular product=Mole % of methane converted to the particular product $$\text{Selectivity for a particular product (\%)} = \left[ \frac{\text{Conversion of methane to the product (\%)}}{\text{Total conversion of methane}} \right] \times 100$$

Productivity (or space-time-yield) for a particular product is the amount of the product fromed in the process per unit weight of catalyst per unit time.

Gas hourly space velocity (GHSV) is the volume of gaseous reactant mixture (measured at STP) passed over a unit weight of catalyst per hour.

In the conversion of natural gas, the selectivity and conversion data are based on the carbon balance.

In Examples 1–4, the preparation of the composite catalysts, containing transitional and alkaline earth metal oxides, prepared by the process described and claimed in our copending patent application Ser. No. 07/943,183 is given. Whereas in the other Examples, the process for oxidative conversion of methane (or natural gas) to synthesis gas over the composite catalysts, the preparation of which is described in Examples 1–4, is illustrated.

EXAMPLE-1

In this example preparation of NiO—CaO catalyst (with Ni/Ca mole ratio of 3.0) is illustrated.

Finely ground 3.7 g of Ca(OH)$_2$, finely ground 43.6 g of Ni(NO$_3$)$_2$.6H$_2$O and 1.0 ml of deionized water are thoroughly mixed and the resulting thick paste is dried in air oven at 120° C. for 15 h. The dried mass is decomposed at 600° C. in air for 4 h. The decomposed mass is then powdered, pressed binder-free at 4 ton pressure and crushed to 20–30 mesh size particles. The catalyst particles are then calcined in air at 930 C. for 4 h to provide the desired NiO—CaO catalyst. The colour of the catalyst was black. The surface area of the catalyst was 2.46 m$^2$g$^{-1}$.

EXAMPLE-2

This example illustrates the preparation of NiO—CaO catalyst with Ni/Ca mole ratio of 0.5.

Finely ground 18.52 g of Ca(OH)$_2$, finely ground 36.4 g of nickel nitrate hexahydrate and 30 ml of deionized water are thoroughly mixed and the resulting paste is dried in air oven at 130° C. for 8 h. The dried mass is then decomposed at 605° C. in air for 5 h. The decomposed solid mass is then powdered, pressed binder-free at 4 ton pressure and crushed to particles of 22–30 mesh. The catalyst particles are then calcined in air at 930° C. for 4 h to provide the desired NiO—CaO catalyst. The colour of the catalyst was gray. The surface area of the catalyst was 0.97 m$^2$g$^{-1}$.

EXAMPLE-3

This example illustrates the preparation of NiO—MgO catalyst with Ni/Mg mole ratio of 1.0.

Finely ground 29.8 g of Ni(NO$_3$)$_2$.6H$_2$O, finely ground 9.4 g of magnesium carbonate and 15 ml of deionized water are thoroughly mixed and the resulting thick paste is dried in air oven at 120° C. for 4 h. The dried mass is decomposed in air at 590° C. for 4 h. The decomposed mass is then powdered, pressed binder-free at 5 ton pressure and crushed to 22–30 mesh size particles. The catalyst particles are then calcined in air at 910° C. for 5 h to provide the desired NiO—MgO catalyst. The colour of the catalyst was gray. The surface area of the catalyst was 5.31 m$^2$g$^{-1}$.

EXAMPLE-4

This example illustrates the preparation of CoO—MgO—BaO catalyst (with Co/(Mg+Ba) mole ratio=Mg/Ba mole ratio=1.0).

Finely ground 23.2 g of Ni(NO$_3$)$_2$.6H$_2$O, finely ground 12.62 g of Ba(OH)$_2$.8H$_2$O, finely ground 3.7 g of magnesium carbonate and 15 ml of deionized water are thoroughly mixed and the resulting mixture is dried in air oven at 122° C. for 6 h. The dried mass is then decomposed at 595° C. in air for 10 h. Decomposed mass is then powdered pressed binder free at 5 ton pressure and crushed to 22-30 mesh size particles. The catalyst particles are then calcined in presence of air at 910° C. for 5 h to provide the desired CoO—MgO—BaO catalyst. The colour of the catalyst was light brown. The surface area of the catalyst was 3.55 m$^2$g$^{-1}$.

EXAMPLE-5

This example illustrates the process for the oxidative conversion of methane to CO and H$_2$ (or synthesis gas) using the NiO—CaO (Ni/Ca mole ratio=3.0), catalyst the preparation of which is described in Example-1.

The oxidative conversion of methane to CO and H$_2$ (i.e. synthesis gas) over the catalyst was carried out in a flow quartz reactor (i.d=5 mm) packed with the catalyst particles (20 mg) using a mixture of pure methane and oxygen as a feed. The reactor temperature was measured by Chromel-Alumel thermocouple located in the catalyst bed. The reactor effluent gases were cooled at about 0° C. to condense the water formed in the reaction using coiled condenser immersed in ice-water slurry and then analysed for CO, CO$_2$, H$_2$ and unconverted methane and O$_2$ by an on-line gas chromatograph using a Spherocarb column. The change in the volumetric flow rate of gases due to the reaction (CH$_4$+½O$_2$⇌CO+2H$_2$) was determined by measuring the flow rate of feed and product gases (after removing water) using soap bubble flow-meter. Before carrying out the reaction, the catalyst was pretreated insitu at the calcination temperature of the catalyst in a flow of pure N$_2$ (50.0 ml. min$^{-1}$) for 1 h.

The process performance was evaluated at the following reaction conditions.

| Feed composition | 67 mol % methane and 33 mol % O$_2$ |
| --- | --- |
| Space velocity | 516,000 cm$^3$ · g$^{-1}$ · h$^{-1}$ |
| Pressure | 1.08 atm. |
| Reaction temperature | 345°–853° C. |

The reaction was carried out first at 853° C. and then at the other temperatures.

The results obtained at different reaction temperatures are as follows.

| | Reaction temperature (°C.) | | | | | |
| --- | --- | --- | --- | --- | --- | --- |
| | 853° | 750° | 650° | 550° | 448° | 345° |
| Total CH$_4$ conversion (%) | 85.9 | 80.2 | 75.5 | 70.1 | 64.7 | 58.2 |
| Selectivity for CO (%) | 96.8 | 95.4 | 91.4 | 90.1 | 85.6 | 81.0 |
| Selectivity for H$_2$ (%) | 97.4 | 97.4 | 94.1 | 92.0 | 90.0 | 80.9 |
| Productivity for CO (mol. g.$^{-1}$ h.$^{-1}$) | 12.9 | 11.8 | 10.7 | 9.8 | 8.6 | 7.3 |
| Productivity for H (mol. g.$^{-1}$ h.$^{-1}$) | 25.8 | 24.1 | 21.9 | 19.9 | 17.9 | 14.6 |
| H$_2$/CO mole ratio in the product. | 2.01 | 2.04 | 2.06 | 2.04 | 2.10 | 2.00 |

EXAMPLE-6

This example illustrates the process for the oxidative conversion of methane to CO and H$_2$ (or synthesis gas) over the NiO—CaO (Ni/Ca mole ratio=3.0) catalyst, the preparation of which is described in Example-1, reduced by hydrogen before the catalytic reaction.

The reaction over the catalyst was carried out in the reactor and by the procedure similar to that described in Example-5 except that the catalyst pretreated insitu was reduced in the flow (60 cm$^3$ min$^{-1}$) of a mixture of H$_2$ and N$_2$ (18% H$_2$) at 400° C. for a period of 1 h, before carrying out the catalytic reaction. The reaction was carried out at the following conditions.

| Feed composition | 67 mol % CH$_4$ and 33 mol % O$_2$ |
| --- | --- |
| Gas hourly space velocity (GHSV) | 515,000 cm$^3$ · g$^{-1}$ · h$^{-1}$ |
| Pressure | 1.08 atm. |
| Reaction temperature | 305°–700° C. |

The results obtained are given below.

| | Reaction temperature (°C.) | | | |
| --- | --- | --- | --- | --- |
| | 305° | 402° | 501° | 700° |
| Total CH$_4$ conversion (%) | 63.0 | 62.3 | 70.0 | 83.4 |
| Selectivity for CO (%) | 80.7 | 81.6 | 87.2 | 92.6 |
| Selectivity for H$_2$ (%) | 80.3 | 82.4 | 84.1 | 92.0 |
| H$_2$/CO mole ratio in product | 1.99 | 2.02 | 1.93 | 1.99 |

When the catalyst was not reduced, the reaction on the catalyst did not occur at or below 550° C.

EXAMPLE-7

This example illustrates the process for the oxidative conversion of natural gas to CO and H$_2$ (or synthesis gas) over the reduced NiO—CaO (Ni/Ca mole ratio=3.0) catalyst, the preparation of which is described in Example-1.

The reaction over the catalyst was carried out in the reactor and by the procedure similar to that described in Example-6 except that, instead of methane, natural gas comprising of methane, ethane and C$_3$- and C$_4$-alkanes, is used in the feed and the catalyst was reduced by H$_2$ (20% H$_2$ in N$_2$) at 500° C. for 1.5 h, at the following process conditions.

| Feed composition | 59.6 mol % CH$_4$, 6.0 mol % C$_2$H$_6$, 1.4 mol % C$_3$- and C$_4$-alkanes, 32 mol % O$_2$, 0.3 mol % CO$_2$ and 0.7 mol % N$_2$. |
| --- | --- |
| GHSV | 515,000 cm.$^3$ g.$^{-1}$ h.$^{-1}$ |
| Pressure | 1.09 atm. |
| Reaction temperature | 404°, 654° and 851° C. |

The results obtained at different temperatures are as follows.

| | Reaction temperature (°C.) | | |
| --- | --- | --- | --- |
| | 404° | 654° | 851° |
| Total carbon conversion (%) | 50.7 | 63.7 | 78.8 |
| Selectivity for CO (%) | 86.2 | 93.2 | 98.0 |
| Selectivity for H$_2$ (%) | 84.5 | 91.6 | 93.6 |
| H$_2$/CO mole ratio in products | 1.96 | 1.97 | 1.91 |

EXAMPLE-8

This example illustrates the process for the oxidative conversion of methane to synthesis gas using the NiO—MgO catalyst, the preparation of which is described in Example-3, reduced by the reaction mixture itself.

The catalytic process was carried out in the reactor and by the procedure similar to that described in Example-5 except that after the pretreatment of catalyst in $N_2$, it was reduced by the reaction mixture at 673° C. for 1 h, at the following process conditions before collecting the process data at different temperatures.

| Feed composition | 67 mol % $CH_4$ and 33 mol % $O_2$ |
|---|---|
| GHSV | 516,000 $cm^3 \cdot g^{-1} \cdot h^{-1}$ |
| Pressure | 1.03 atm. |
| Reaction temperature | 245°–850° C. |

The results at different reaction temperatures are as follows.

| | Reaction temperature (°C.) | | | | |
|---|---|---|---|---|---|
| | 658° | 430° | 300° | 245° | 850° |
| Total $CH_4$ conversion (%) | 78.1 | 69.1 | 66.8 | 60.8 | 84.1 |
| Selectivity for CO (%) | 97.1 | 86.4 | 82.4 | 78.5 | 95.7 |
| Selectivity for $H_2$ (%) | 99.2 | 94.4 | 89.2 | 89.7 | 90.1 |
| $H_2$/CO mole ratio in products | 2.16 | 2.19 | 2.17 | 2.27 | 1.90 |

When the catalyst was not reduced by the reaction mixture at 673 C., the catalytic reaction did not occur below 600° C.

EXAMPLE 9

This example illustrates the process for oxidative conversion of methane to synthesis gas using CoO-MgO-BaO catalyst, the preparation of which is described in Example-4. The reaction over the catalyst was carried out in the reactor and by the procedure similar to that described in Example-5 at the following process conditions.

| Feed composition | 66 mol % $CH_4$ and 34 mol % $O_2$ |
|---|---|
| GHSV | 516,000 $cm^3 \cdot g^{-1} \cdot h^{-1}$ |
| Pressure | 1.10 atm. |
| Reaction temperature | 365°–855° C. |

The reaction was carried out first at 651° C. and then the other temperatures. The results at different temperatures are as follows.

| | Reaction temperature (°C.) | | | | |
|---|---|---|---|---|---|
| | 855° | 751° | 651° | 454° | 365° |
| Total $CH_4$ conversion (%) | 100.0 | 92.9 | 89.9 | 82.2 | 76.1 |
| Selectivity for CO (%) | 100.0 | 87.7 | 85.7 | 79.0 | 73.9 |
| Selectivity for $H_2$ (%) | 93.3 | 88.1 | 85.9 | 80.0 | 80.8 |
| $H_2$/CO mole ratio | 1.87 | 2.01 | 2.01 | 2.03 | 2.19 |

EXAMPLE-10

This example illustrates the process for the oxidative conversion of methane to CO and $H_2$ (or synthesis gas) using the NiO—CaO (Ni/Ca mole ratio=0.5) catalyst, the preparation of which is given in Example-2, without the catalyst reaction.

The catalytic process was carried out in the reactor and by the procedure similar to that described in Example-5, at the following conditions.

| Feed composition | 66 mol % $CH_4$ and 34 mol % $O_2$ |
|---|---|
| GHSV | 609,000 $cm^3 \cdot g^{-1} h^{-1}$ |
| Pressure | 2.1 atm. |
| Reaction temperature | 401°–752° C. |

The reaction was carried out first at 752° C. and then at the other temperatures.

The results obtained in the process are as follows.

| | Reaction temperature (°C.) | | |
|---|---|---|---|
| | 752° | 650° | 551° |
| Total $CH_4$ conversion (%) | 78.3 | 73.1 | 63.8 |
| Selectivity for CO (%) | 94.2 | 90.4 | 86.1 |
| Selectivity for $H_2$ (%) | 95.7 | 91.0 | 84.3 |
| $H_2$/CO mole ratio | 2.03 | 2.01 | 1.96 |

EXAMPLE-11

This example illustrates the process for the oxidative conversion of methane to synthesis gas (CO and $H_2$) using the reduced NiO—CaO (Ni/Ca mole ratio=3.0) catalyst, preparation of which is given in Example-1, at different gas hourly space velocities.

The catalytic process was carried out in the reactor and by the procedure similar to that described in Example-6, at the following conditions.

| Feed composition | 67 mol % $CH_4$ and 33 mol % $O_2$ |
|---|---|
| Pressure | 1.1 atm. |
| Gas hourly space velocity | $5.42 \times 10^4$–$2.15 \times 10^6$ $cm^3 \cdot g^{-1} \cdot h^{-1}$ |
| Reaction temperature | 500°–751° C. |

The results obtained at the different gas hourly space velocities and reaction temperatures are as follows.

| Reaction temp. °C. | 655° | 753° | 652° | 751° | 500° | 652° |
|---|---|---|---|---|---|---|
| GHSV, $cm^3 \cdot g^{-1} \cdot h^{-1}$ | $5.42 \times 10^4$ | $5.42 \times 10^4$ | $5.16 \times 10^5$ | $5.16 \times 10^5$ | $9.7 \times 10^5$ | $2.15 \times 10^6$ |
| Total $CH_4$ conversion (%) | 54.7 | 67.4 | 76.0 | 80.1 | 60.1 | 52.4 |
| Selectivity for CO (%) | 74.8 | 90.2 | 91.5 | 95.3 | 86.8 | 88.6 |
| Selectivity for $H_2$ (%) | 84.4 | 90.1 | 94.0 | 96.4 | 80.9 | 75.8 |
| $H_2$/CO mole ratio | 2.26 | 2.00 | 2.06 | 2.02 | 1.86 | 1.71 |
| Productivity for CO (mol $\cdot g^{-1} \cdot h^{-1}$) | 0.66 | 0.99 | 10.73 | 11.78 | 15.14 | 29.86 |
| Productivity for | 1.50 | 1.98 | 22.11 | 23.86 | 28.15 | 51.05 |

-continued

| Reaction temp. °C. | 655° | 753° | 652° | 751° | 500° | 652° |
|---|---|---|---|---|---|---|
| GHSV, $cm^3 \cdot g^{-1} \cdot h^{-1}$ | $5.42 \times 10^4$ | $5.42 \times 10^4$ | $5.16 \times 10^5$ | $5.16 \times 10^5$ | $9.7 \times 10^5$ | $2.15 \times 10^6$ |
| $H_2$ (mol $\cdot g^{-1} \cdot h^{-1}$) | | | | | | |

EXAMPLE-12

This example illustrates the process for the oxidative conversion of methane to synthesis gas (CO and $H_2$) using the reduced NiO—CaO (Ni/Ca mole ratio=3.0) catalyst, the preparation of which is given in Example-1, at different $CH_4/O_2$ mole ratios in the feed.

The catalytic process was carried out in the reactor and by the procedure similar to that described in Example-6, using a mixture of pure methane and $O_2$ as feed at the following reaction conditions.

| | |
|---|---|
| $CH_4/O_2$ mole ratio in feed | 2–4 |
| Pressure | 1.15 atm. |
| Gas hourly space velocity | 516,000 $cm^3 \cdot g^{-1} \cdot h^{-1}$ |
| Reaction temperature | 500°–607° C. |

The results obtained at the different CH/O mole ratios in feed and reaction temperatures are given below.

| Reaction temp. °C. | 501° | 607° | 601° | 502° | 606° | 502° |
|---|---|---|---|---|---|---|
| $CH_4/O_2$ mole ratio | 2.0 | 2.0 | 3.0 | 3.0 | 4.0 | 4.0 |
| Total $CH_4$ conversion (%) | 65.0 | 72.4 | 51.7 | 47.7 | 36.0 | 28.3 |
| Selectivity for CO (%) | 85.3 | 90.2 | 87.2 | 82.0 | 90.2 | 72.9 |
| Selectivity for $H_2$ (%) | 84.5 | 86.4 | 86.5 | 78.3 | 91.4 | 79.3 |
| $H_2$/CO mole ratio | 1.98 | 1.92 | 1.98 | 1.91 | 2.03 | 2.18 |

EXAMPLE-13

This example illustrates the process for the oxidative conversion of methane to synthesis gas (CO and $H_2$) using the reduced NiO—CaO (Ni/Ca mole ratio=3.0) catalyst, the preparation of which is given in Example-1, at different $H_2O/CH_4$ mole ratio in the feed.

The catalytic process was carried out in the reactor and by the procedure similar to that described in Example-6, using a mixture of pure $CH_4$,$O_2$ and water vapours as a feed at the following reaction conditions.

| | |
|---|---|
| $CH_4/O_2$ mole ratio in feed | 2.0 |
| $H_2O/CH_4$ mole ratio in feed | 0 1.0 |
| Pressure | 1.2 atm. |
| Gas hourly space velocity | 520,500 $cm^3 \cdot g^{-1} \cdot h^{-1}$ |
| Reaction temperature | 409°–851° C. |

The results obtained at different $H_2O/CH_4$ mole ratios in feed and reaction temperatures are given below.

| Reaction temp. °C. | 650° | 655° | 752° | 646° | 755° | 851° |
|---|---|---|---|---|---|---|
| $H_2O/CH_4$ mole ratio | 0.0 | 0.1 | 0.1 | 1.0 | 1.0 | 1.0 |
| Total $CH_4$ conversion (%) | 76.1 | 67.6 | 77.3 | 54.4 | 62.1 | 69.8 |
| Selectivity for CO (%) | 92.6 | 86.7 | 91.5 | 45.9 | 53.2 | 64.4 |
| Selectivity for $H_2$ (%) | 94.2 | 91.5 | 92.5 | 83.9 | 85.6 | 94.4 |
| $H_2$/CO mole ratio | 2.04 | 2.11 | 2.02 | 3.66 | 3.22 | 2.93 |

The main advantages of the invention are
(i) The process of the present invention involves oxidative conversion of methane (or natural gas) to synthesis gas, which is mildly exothermic reaction, and hence the process is not energy intensive.

(ii) The process of the present invention uses novel composite catalyst containing transitional (preferably Ni or Co) and alkaline earth metal oxides, which is much cheaper than the catalyst containing costly noble metal like ruthenium in stochiometric quantities with other elements, used in the prior art.

(iii) The novel composite catalysts used in the process of present invention show very high activity/selectivity, very high productivity for hydrogen and carbon monoxide and long life in the oxidative conversion of methane (or natural gas) to synthesis gas.

(iv) Synthesis gas could be produced by the process of the present invention in high yields with very high production rate at much lower temperatures than that used in the different processes known in the prior art.

(v) The process of the present invention is operated at much higher space velocities that that used in the different processes known in the prior art.

(vi) In the process of the present invention the $H_2$/CO mole ratio in the product gas is about 2.0 and if required can be increased above 2.0 by adding water vapours in the feed.

We claim:

1. A process for the production of synthesis gas consisting of a mixture of carbon monoxide and hydrogen by oxidative conversion of methane or natural gas, the process comprising 1) passing continuously a gaseous reaction mixture comprising the methane or natural gas and oxygen, with or without water vapors, over a composite catalyst containing transition and alkaline earth metal oxides in a fixed bed reactor at a pressure in the range of 0.5–50 atm, a temperature in the range of 300°–900° C., a gas hourly space velocity in the range of $10^3$–$10^8$ $cm^3 \cdot g^{-1} h^{-1}$, a $CH_4$ or natural gas/$O_2$ mole ratio in the range of 1.8 to 4, and a $H_2O/CH_4$ or natural gas mole ratio in the range of 0–3.0, whereby to produce gaseous products containing synthesis gas; said composite catalyst being represented by the formula $T_mAO_n$, wherein T is a transition element selected from the group consisting of Ni, Co, Pd, Ru, Rh, Ir and mixtures thereof, wherein m is a mole ratio of T/A and is from 0.01 to 100, wherein A is an alkaline earth element selected from the group consisting of Mg, Ca, Ba, Sr and mixtures thereof, wherein O is oxygen and n is a number of oxygen atoms required to fulfil the valence requirement of the transition and alkaline earth elements in the catalyst, and wherein the composite catalyst is prepared by (i) mixing thoroughly catalyst precursors consisting essentially of:
a) one or more finely ground transitional metal compounds represented by the formula $TX_a$; wherein T is the transitional element; wherein X is selected from the group consisting of $NO_3$, $CH_3COO$, $OH$, $O$, $CO_3$ and Cl; and wherein a is a number of X required to complete the valence requirement of the transitional element; and b) one or more finely ground alkaline earth metal compounds represented by the formula $AY_b$; wherein A is the alkaline earth element; wherein Y is selected from the group consisting of $NO_3$, OH, O, $CO_3$ and $CH_3COO$; and wherein b is a number of Y required to complete the valence requirement of the alkaline earth element; said catalyst precursors having a T/A mole ratio of about 0.01 to about 100; ii) heating the mixture of catalyst precursors to dryness at a temperature of about 80°–250° C. in air to form a dried mass; iii) decomposing the dried mass containing catalyst precursors to their oxides at a temperature of about 400°–1200° C. in the presence of air or inert gas or under vacuum for about 0.5 to 50 h to form a decomposed mass; iv) powdering the decomposed mass and forming catalyst pellets, extrudes or granules therefrom; and v) calcining the catalyst at a temperature of about 400°–1500° C. in the presence of air, inert gas, CO or their mixture or under vacuum for about 1 to 100 h; and 2) separating the synthesis gas from the gaseous products.

2. An improved process as claimed in claim 1 wherein the pressure employed ranges from about 1 to 5 atm.

3. An improved process as claimed in claim 1 wherein the reaction temperature ranges from about 300° to 900° C.

4. An improved process as claimed in claim 1 wherein the gas hourly space velocity ranges from $2\times10^4$ to $2\times10^6$ $cm^3.g^{-1}.h^{-1}$.

5. An improved process as claimed in claim 1 wherein the concentration of methane in feed ranges from 20 to 80 mole %.

6. An improved process as claimed in claim 1 wherein the concentration of oxygen in feed ranges from 10 to 36 mole %.

7. An improved process as claimed in claim 1 wherein the concentration of water in the feed ranges from 0 to 65 mole %.

8. An improved process as claimed in claim 1 wherein the concentration of $N_2$, Ar or their mixture in the feed ranges from 0 to 60 mole %.

9. An improved process as claimed in claim 1 wherein the concentration of ethane in the feed ranges from 0 to 10 mole %.

10. An improved process as claimed in claim 1 wherein the concentration of $C_3$- and $C_4$-alkanes in the feed ranges from 0 to 5 mole %.

11. An improved process as claimed in claim 1 wherein the concentration of $CO_2$ in the feed ranges from 0 to 10 mole %.

12. An improved process as claimed in claim 1 wherein the $H_2O/CH_4$ (or natural gas) mole ratio in the feed ranges from 0 to 1.

13. An improved process as claimed in claim 1 wherein the catalyst is reduced before the catalytic reaction by passing continuously a gaseous mixture comprising hydrogen and inert gas such as $N_2$ or Ar with $H_2$ concentration in the range 5–90 mole % at pressure in the range of 0.5 to 5.0 atm, at temperature in the range of 300° to 700° C., at gas hourly space velocity in the range of $10^3$ to $10^5$ $cm^3.g^{-1}.h^{-1}$ for a period in the range of 0.5 to 20 h.

14. An improved process as claimed in claim 13 wherein the catalyst reduction is effected by passing continuously the reaction mixture over the catalyst at temperature in the range of 600° to 900° C. for a period in the range of 0.5 to 10 h.

15. An improved process as claimed in claim 1 wherein, for the catalyst, the transitional element is chosen from Ni, Co or their mixture, the alkaline earth element is chosen from Mg, Ca, or the like or their mixture and the transitional metal/alkaline earth metal mole ratio is in the range of 0.1 10.0.

* * * * *